US011428263B2

(12) United States Patent
Girotto et al.

(10) Patent No.: US 11,428,263 B2
(45) Date of Patent: Aug. 30, 2022

(54) MAGNETIC LEVITATION ROTARY BEARING

(71) Applicant: IRONBOX S.R.L., Spresiano (IT)

(72) Inventors: Adriano Girotto, Spresiano (IT); Luca Cesaretti, Spresiano (IT); Lorenzo Andrea Parrotta, Spresiano (IT); Riccardo Contini, Spresiano (IT)

(73) Assignee: IRONBOX S.R.L., Spresiano (IT)

( * ) Notice: Subject to any disclaimer, the term of this patent is extended or adjusted under 35 U.S.C. 154(b) by 156 days.

(21) Appl. No.: 16/761,251

(22) PCT Filed: Nov. 4, 2018

(86) PCT No.: PCT/IB2018/058645
§ 371 (c)(1),
(2) Date: May 3, 2020

(87) PCT Pub. No.: WO2019/087152
PCT Pub. Date: May 9, 2019

(65) Prior Publication Data
US 2020/0362913 A1 Nov. 19, 2020

(30) Foreign Application Priority Data
Nov. 6, 2017 (IT) .................. 102017000125570

(51) Int. Cl.
*F16C 32/04* (2006.01)
(52) U.S. Cl.
CPC .................. *F16C 32/041* (2013.01)

(58) Field of Classification Search
CPC .......... F16C 32/0406; F16C 32/0408; F16C 32/041; F16C 32/0412; F16C 32/0414; F16C 32/0419; F16C 32/0421; F16C 32/0423; F16C 32/0425; F16C 32/0427; F16C 32/0429; F16C 32/0431; F16C 32/0434; H02K 7/09
USPC ........................................ 310/90.5
See application file for complete search history.

(56) References Cited

U.S. PATENT DOCUMENTS

| 5,142,176 | A | | 8/1992 | Takahashi |
| 5,343,811 | A | * | 9/1994 | Schuster ............ B61B 13/08 104/281 |
| 2014/0111039 | A1 | * | 4/2014 | Hashish ............ H02K 7/09 310/51 |

* cited by examiner

*Primary Examiner* — Ahmed Elnakib
(74) *Attorney, Agent, or Firm* — Mark M. Friedman

(57) ABSTRACT

A magnetic suspension bearing (10; 30; 40; 50) is described comprising a part rotatable about a rotation axis and a fixed part, and two elements made of ferromagnetic material, one integral with the rotatable part and one with the fixed part. The two elements are closely placed, separated by an air gap, and have axial symmetry with respect to said axis. There is a magnetic flux generator for generating a magnetic flux inside the two elements. The two elements have such a shape that the magnetic flux, flowing inside the two elements, describes in space a torus and passes from one element to the other through the air gap along a direction orthogonal to the direction of a load applied to the bearing.
This configuration ensures high support strength for the bearing while being a simple structure to be built.

16 Claims, 5 Drawing Sheets

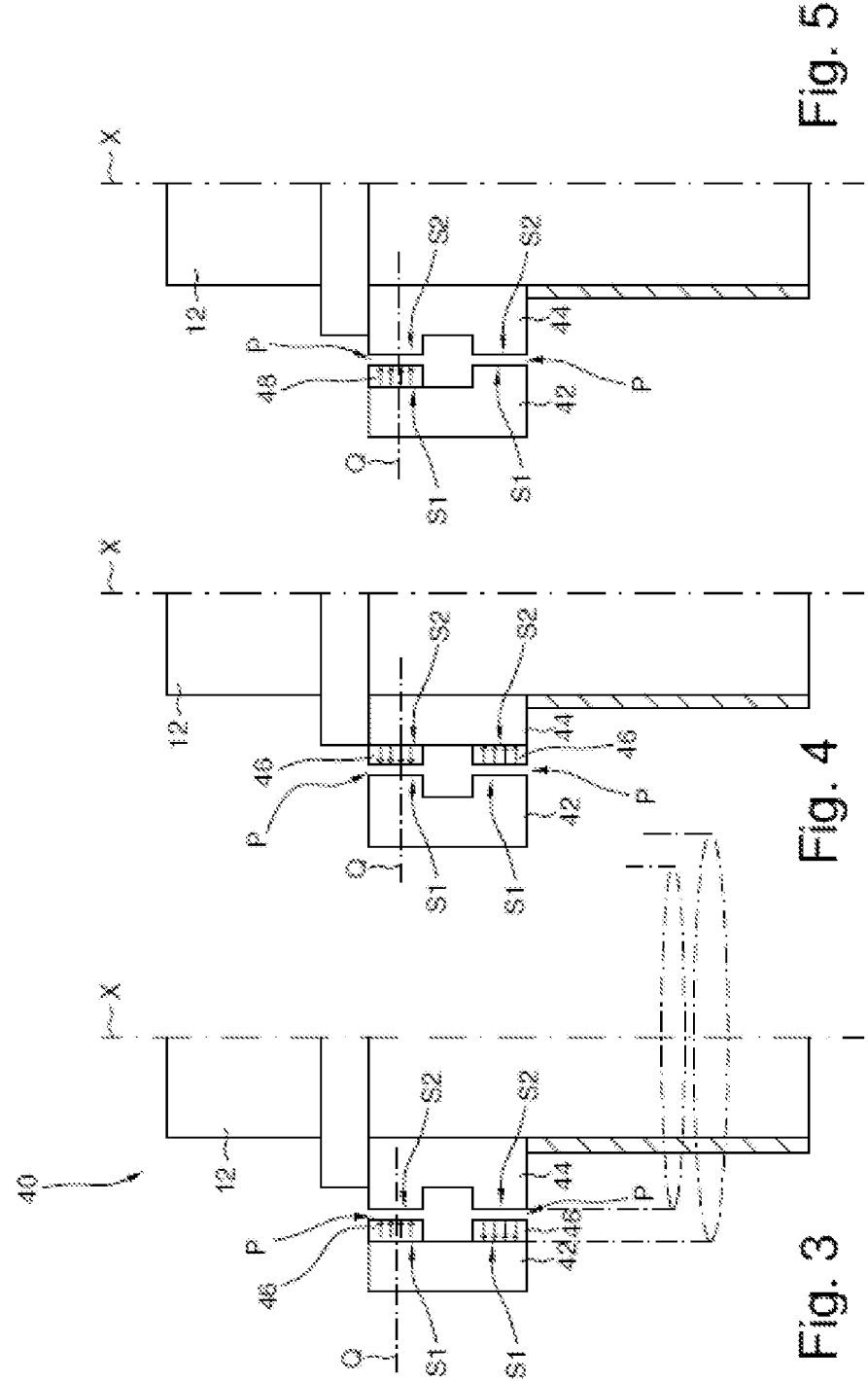

MAGNETIC LEVITATION ROTARY BEARING

The invention relates to a rotary bearing, based on passive magnetic levitation, which serves for rotary couplings, and is generally interposed between a support and a pin or shaft in order to reduce friction and wear of the materials.

Traditional rotary bearings are based on sliding friction systems characterized by a direct coupling between two sliding surfaces or with the interposition of rolling elements, generally spheres or rollers. The use of rolling elements, although ensuring low levels of friction, involves high levels of tension to which the rolling elements themselves are subjected (line or spot loads) with consequent problems e.g. of duration to stress. Not even the improvements obtained with lubricated systems are adequate, given the greater constructive complexity and the need to guarantee the constant presence of lubricant.

To reduce friction, solutions have emerged that exploit the principles of magnetic levitation, see e.g. EP2422100. The most common use active magnetic levitation, which support the load by means of electromagnets as well as guaranteeing the balance and the overall equilibrium. Obviously the energy spent for the electromagnets is at the expense of efficiency. Also systems are known based on passive magnetic levitation such as those which exploit eddy currents on a conducting surface. They allow to support the load, such as through the use of Halbach arrays, but do not guarantee operation at low speeds.

Therefore it is desired to remedy one or more of these problems by proposing an alternative, in particular a magnetic suspension rotary bearing that is inexpensive, with few energy dispersions and contained complexity.

The bearing is defined in the appended claims, in which the dependent ones define advantageous variants.

The proposed bearing can replace the traditional rotary bearings, both of radial and axial type.

The advantages of the invention will be clearer from the following description containing also preferred embodiments of bearing, reference being made to the attached drawing in which FIG. 1 shows a cross-section of a first bearing;

FIGS. 3-5 show a second bearing and its variants in cross-section;

In the figures, equal numbers indicate equal or conceptually similar parts; the letters N and S respectively indicate North and South magnetic poles; and the arrows in a material indicate magnetic flux lines.

Figure 1:
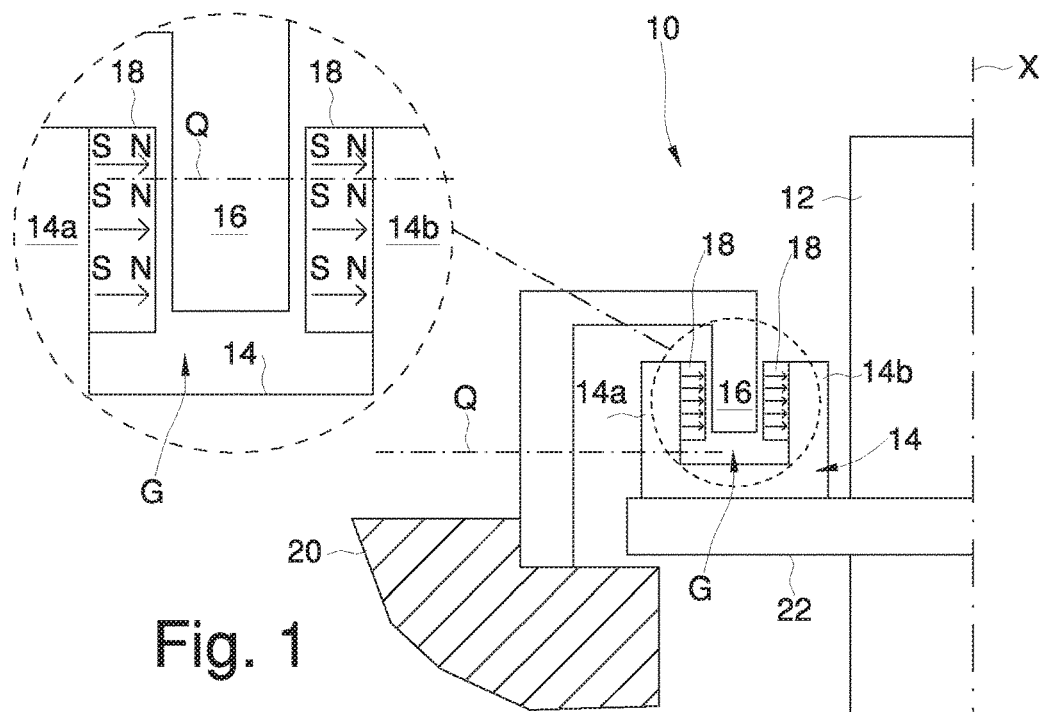

In general, the passive bearing comprises:

a rotating part, which is rotatable about a rotation axis of, and one fixed part or support, two elements made of ferromagnetic material, one integral with the rotating part and one to the fixed part, placed close together and separated by an air gap, and a magnetic flux generator, for example a permanent magnet, for generating a magnetic flux inside the two elements.

In general, the position of the two elements can be exchanged with respect to the fixed and rotating part, and the rotating part may carry an axial or radial load.

By axial load it is meant an antagonistic force acting on the rotating part parallelly or coaxially to the rotation axis.

By radial load it is meant an antagonistic force acting on the rotating part orthogonally to the axis of rotation.

By passive bearing it is meant a bearing that generates an antagonist force without energy supply from the outside.

The magnetic flux forms a torus in space as it flows inside the two elements (except for inevitable small dispersions) and passes from one element to the other crossing the air gap along a direction orthogonal to the direction of the load applied to the bearing. Seen in a cross-section relative to a plane passing through the rotation axis, the generator therefore generates a circular tube of magnetic flux that flows inside the two elements (except inevitable small dispersions) and passes from one element to the other crossing the air gap along a direction orthogonal to the direction of the load applied to the bearing.

The physical principle on which the bearing is based is as follows.

The bearing is composed of two elements of ferromagnetic material (one integral to the hub and one to the shaft, respectively), having axial-symmetrical shape (symmetry of shape about an axis) or of circular sector. Their cross-section and arrangement is such as to form a closed magnetic circuit having an air gap bounded by two facing (and, if viewed in transverse cross-section, parallel) surfaces having perpendicular line which is orthogonal to the load direction (axial or radial). A magnetic flux generator produces a flux that loops in the circuit and crosses the air gap with an direction orthogonal to the load direction. This configuration is in equilibrium along the direction of the load, and if the load tends to misalign the air gap's (sur)faces the reluctance of the circuit increases. A magnetic reaction force is then generated which tends to report the two elements in the equilibrium configuration of minimum reluctance.

Note that the configuration of the magnetic circuit is such to create for the two elements a point of equilibrium when they are in a relative position of zero load. This is because the magnetic reaction force between the two elements is always attractive and facing the point of equilibrium, however the movable element of the two moves relative to the other (in particular, forward or backward along a straight line).

Also note that the magnetic circuit's configuration is such to generate a magnetic reaction force between the two elements which is substantially constant or linearly variable as the relative displacement of one element with respect to the other varies. The relative movement between the two elements would tend to extract or move away the first element from the second, while the direction of the magnetic flux that passes through the air gap remains substantially constant and substantially orthogonal to the direction of the relative movement and to said facing surfaces. This allows the magnetic field's reaction force between the two elements to have constant or approximately constant or linearly variable value, and not the classic trend which is inversely proportional to the distance between interacting magnetic poles.

The two elements do not necessarily have to be of axial-symmetrical shape, for example they may be made up of several circular sectors arranged uniformly and/or evenly spaced along a circumference.

In a variant, the passive magnetic bearing is coupled to a magnetic bearing of active type. This configuration allows supporting the static load along one direction (axial or radial) by means of the passive bearing, and the dynamic load and the load along the other loading directions by means of the active bearing. This allows high performance in terms of control of the dynamics and reduction of the vibrations characteristic of the active magnetic bearing, with the advantage of supporting the main load passively and therefore with high levels of efficiency compared to a fully-active solution.

In a variant of bearing for axial load, the generator is configured to generate a circular tube of magnetic flux which, seen in cross-section with respect to a plane passing through the rotation axis, flows inside the two elements (except for inevitable small dispersions) and passes from one element to the other crossing the air gap along a radial direction (i.e. orthogonal) to the rotation axis.

In a variant of bearing for radial load, the generator is configured to generate a circular tube of magnetic flux which, seen in cross-section with respect to a plane passing through the rotation axis, flows inside the two elements (except for inevitable small dispersions) and passes from one element to the other crossing the air gap along a direction parallel to the rotation axis.

In a variant, the flux passes through a cavity or recess formed by the first element, and the second element is inserted into the cavity or recess being able to move linearly in a parallel direction with respect to the axis. The flux that flows through the cavity or recess has direction substantially orthogonal to the rotation axis, therefore it hits transversely the second element. That is, the flux that passes through the cavity or recess comes out of a surface of the first element, penetrates a surface of the second element, exits from an opposite surface of the second element, and penetrates into a surface of the first element. In this variant, preferrably the first and second elements are inserted one into the other.

In a preferred embodiment, the cavity or recess is delimited by two facing and parallel surfaces of the first element, and the flux that passes through the cavity or recess comes out of a surface and penetrates into the other.

In a variant, the air gap coincides with a small radial space provided between the first and second element. In particular, the small radial space provided between the first and second element has the shape of a ring coaxial to the rotation axis.

In a different variant, there is no interlocking between the first and second element, that is to say that the first and second elements are juxtaposed but not inserted into one another.

The flux that crosses the air gap or gap has direction substantially orthogonal to the rotation axis, and in one direction it exits a surface of the first element and penetrates into a surface of the second element, and in the opposite direction it comes out of a surface of the second element and penetrates into a surface of the first element.

In a preferred embodiment, the air gap or radial gap is bounded by two facing and parallel surfaces, each surface belonging to one element respectively. In an even more preferred embodiment, said two facing surfaces lie on side surfaces of imaginary cylinders having as axis the rotation axis, and respectively increasing radius and no intersection with the respective element. In an even more preferred embodiment, said two facing surfaces consist of the lateral surfaces of cylinders having as axis the rotation axis, respectively increasing radius and no intersection with the respective element. The imaginary cylinders are shown by dashed ellipses in FIG. 3.

The shape of the two elements of the levitation system is characterized by symmetry with respect to rotation. As an example, if the flux generator is constituted of a permanent magnet, such magnet has preferably rin shape, generating a radial or axial flux, according to the type of bearing. Thus, the magnetic flux lines in the two elements form a torus. For variants related to different configurations of the flux generator consisting of a permanent magnet see FIGS. 10÷14.

The operating principle is similar if we consider portions or circular sectors. In a preferred embodiment the sectors are uniformly distributed along the circumference.

The system described above allows supporting the load by exploiting a magnetic force obtained with passive levitation, which allows high levels efficiency, without compromising its constructive simplicity.

Preferably, the bearing comprises centering means along the unsupported load direction, e.g. a known rotary support. For example, without loss of generality, if the bearing is for axial load, the bearing may be coupled to a known radial ball bearing that guarantees centering and support along the radial direction.

In a preferred embodiment, the magnetic flux generator is arranged between the two elements, particularly inside the cavity or recess, or above said parallel and facing surfaces.

The particular configuration of the bearing gives advantages over the traditional technologies especially for applications with constant loads directed predominantly along a load direction, axial or radial. An example of this application are the turbines for power generation or the aerospace field.

Figure 2:
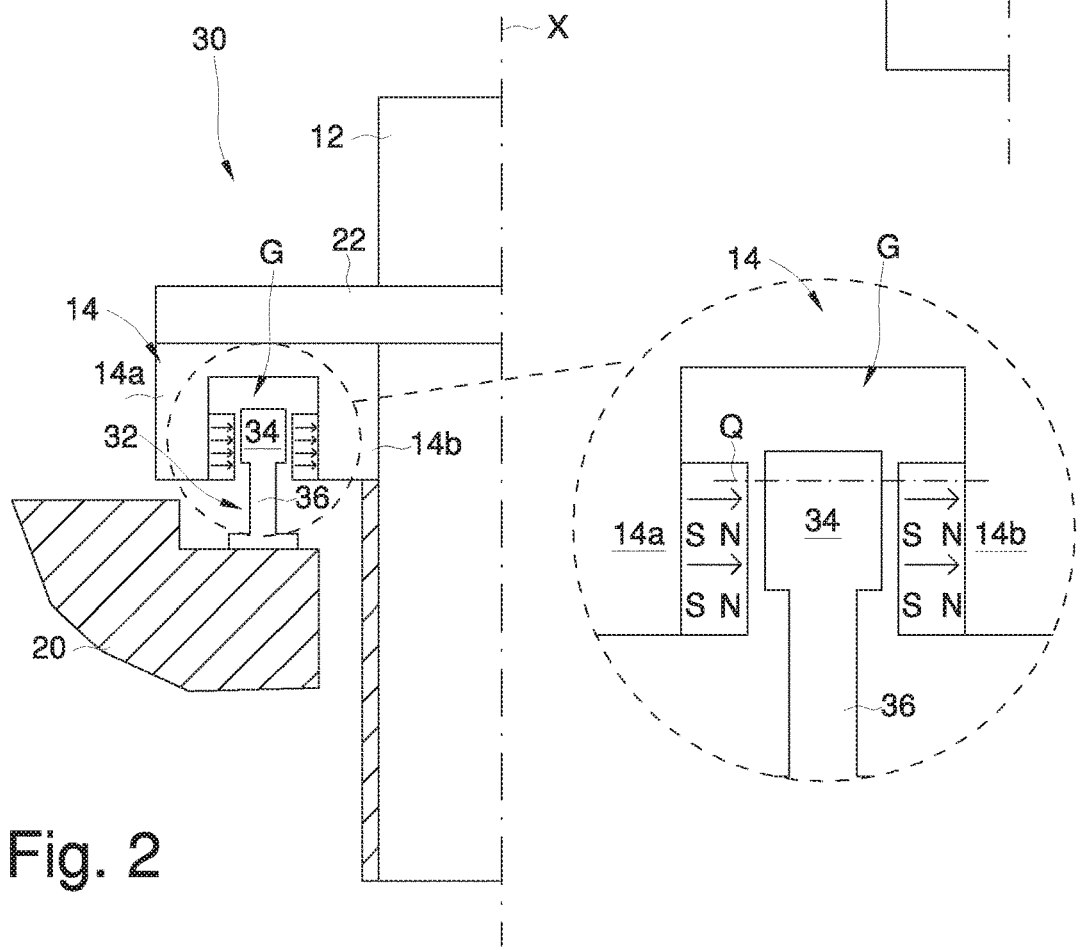
FIG. 2 shows a cross-section of a variant of the first bearing.

FIGS. 1-2 show preferred bearing configurations for axial loads.

In FIG. 1 a bearing 10 is able to support a monodirectional load, directed along an axis X, which tends to move a shaft 12 towards the bottom (of the page) with respect to to a fixed hub 20. The shaft 12 is rotatable—in use—around the axis X.

The bearing 10 comprises
a ring 14 made of ferromagnetic material having U-shaped cross-section, which is connected to the shaft 12 by a disk 22, and
a ring 16 made of ferromagnetic material, having a rectangular cross-sectioned end made of ferromagnetic material that fits inside the U cross-section and is integral with the hub 20.

The volume of the ring 14 is run by a magnetic flux generated by a flux generator, e.g. two rings 18 of permanent magnet with flux being radial (that is, orthogonal) with respect to the X axis. The polarity of the magnets of the rings 18 is the same, for both inbound or outbound.

The magnetic flux has an approximately toroidal spatial distribution: it runs circularly the U cross-section and crosses the empty space between the two parallel segments of the U, indicated with 14a, 14b, as well as passing through the ring 16.

The physical operating principle of the system is also illustrated in the document PCT IB 2017 052588.

The facing surfaces of the U are substantially parallel to each other and also the surfaces of the rings 18. Then, the rings 18 generate between the surfaces of the U a magnetic field along an axis Q, orthogonal to X, which hits orthogonally the surfaces of the ring 16 which occupies and forms the air gap of the magnetic circuit.

The load tends to make the ring 16 come out of the space G between the surfaces 14a, 14b of the U, but this relative sliding involves as a reaction the generation of a magnetic suction force, which counteracts the load. The reaction force acts as long as the facing surfaces of the disk 16 overlap, even partially, with the surfaces of the rings 18, i.e. until the ring 16 is at least for a segment inserted inside the U.

Note that it is the particular geometric arrangement between the polar axis Q of the magnets in the rings 18 and the sliding direction of the ring 16 to ensure that the magnetic suction reaction is constant or almost constant as long as there is overlap between their surfaces.

By overlap between the surfaces of the ring 16 and the surfaces 14a, 14b of the U we mean the orthogonal projection (along Q) of the first ones on the second ones with non-zero area.

So, when the shaft 12 is pushed down by the load, the rectangular cross-section of the ring 16 would tend to exit the U-shaped cross-section, but a magnetic reaction force opposes this by trying to bring the cross-section back inside the U.

As a variant, the position of the ring 14 and of the ring 18 can be swapped, and/or the elements connected between shaft and hub can be swapped.

FIG. 2 shows a bearing 30 similar to the previous one, which is different by the presence of a ring 32 characterized by a cross-section 34 radially wider than a narrowing 36 of the cross-section. It is the cross-section 34 to be arranged between the magnetic rings 18, and the facing surfaces of the magnetic rings 18 and of the section 34 are substantially equal.

In the position in which the cross-section 34 is placed between the magnetic rings 18 and it is crossed by the generated magnetic flux (minimum gap condition) a balance is obtained with respect to loads directed along the X axis in two opposite directions. The cross-section 34 is in fact sucked between the magnetic rings 18 when it tries to leave from above or from below his rest position, because in each case the thickness of ferromagnetic layer that the flux crosses at an edge of the magnetic rings 18 decreases (i.e. the total magnetic reluctance of the circuit increases).

FIG. 3 shows another bearing 40 for axial load, which comprises two elements 42, 44 made of ferromagnetic material which form a circuit for magnetic flux. The first element 42 is external, fixed and integral with a hub (not shown); the second element 44 is internal, rotatable and coupled with the shaft 12. The two elements 42, 44 are annular shaped and cross-sections that together form a torus interrupted by an annular meatus. In fact, the two elements 42, 44 in cross-section each exhibit two facing and opposing surfaces S1, S2 that leave a small space P therebetween. In such space P, along a direction Q orthogonal to X, magnetic flux generated by one or more magnetic flux generators recirculates.

FIGS. 3÷5 show some examples, without loss of generality, for the flux generators.

In FIG. 3 the inner ring 44 has C cross-section, and the flow generator consists of two rings 46 of permanent magnet having radial polar axis parallel to the Q axis and of opposite sign (one outbound and one inbound). The rings 46 are respectively located at the two surfaces S2 of the inner ring 44, and the flux generated by them flows circularly inside the elements 42, 44 jumping from one to the other along the space P.

In FIG. 4 the outer ring 42 has a C cross-section, and the flux generator is made up of magnets 46 arranged near the two surfaces S1 of the inner ring 44 (the opposite of FIG. 3).

In FIG. 5 the inner ring 44 has a C cross-section, and the flux generator consists of a single permanent magnet 48 arranged in correspondence of a shoulder of the ring 42 (the ring 42 has an L-shaped cross-section).

In FIGS. 3÷5 the permanent magnets 46 generate a magnetic flux which closes inside the rings 42, 44 and, along a direction parallel to Q, through the space P. The illustrated configuration is that in which the magnetic circuit has lower reluctance to flux. A misalignment of the rings 42, 44 due to the axial load increases the reluctance of the circuit and generates a return force towards the rest position shown in FIGS. 3-5.

In FIGS. 3÷5 all the permanent magnets have polar axis orthogonal to the X axis, and the position of the rings and/or permanent magnets can be swapped from one ring to the other.

Figure 6:
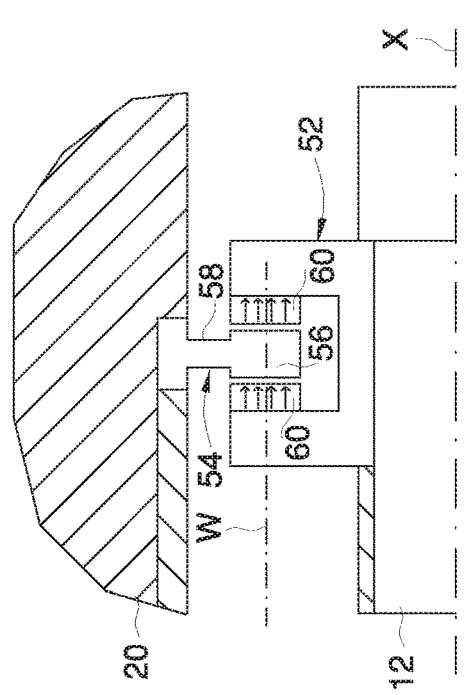
FIGS. 6-8 show a third bearing and its variants in cross-section.

In FIGS. 6÷8 there are shown preferred embodiments of radial bearing.

The bearing 50 in FIG. 6 comprises two annular elements 52, 54, the first fixed on the hub 20 and the second fixed on the shaft 12.

The element 52 has a U cross-section and the element 54 has a rectangular cross-section 56 with a narrowing 58 of the thickness (a sort of mushroom-shaped cross-section).

The element 52 and the element 54 are coupled in such a way that the greater cross-section 56 is inside the U cross-section, similarly to the coupling of FIG. 2.

Figure 7:
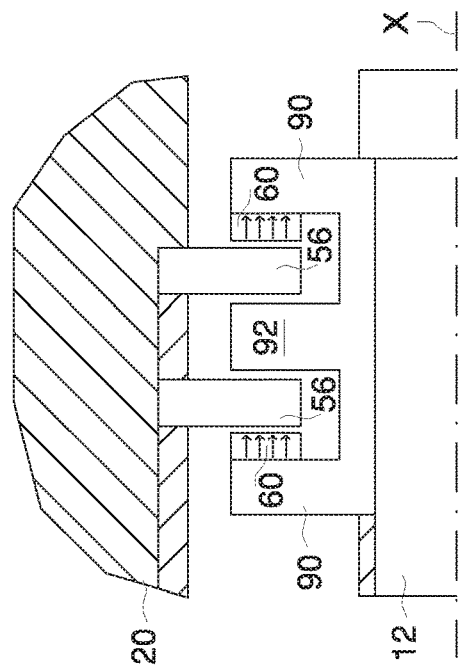

The extremes of the U can be turned towards the shaft 12 (towards the X axis) and integral with the hub 20 (FIG. 6) or facing radially outwards and coupled to the shaft 12 (FIG. 7). In other words, one can swap the position of the elements 52, 54.

The U cross-section and the rectangular cross-section 56 are traversed by a magnetic flus generated by a flux generator, which, without loss of generality, may consist of a pair of rectangular cross-sectioned annular magnets placed on the two parallel surfaces inside the mouth of the U cross-section. The magnets 60 have polar axis W parallel to the X axis and with the same direction, therefore at the entry of the U they generate a flux directed parallel to the X axis that, passing from one leg of the U to the other, hits the cross-section 56.

If the shaft 12 is subjected to a load directed in radial direction (orthogonal to the X axis and tending to misalign the X axis with respect to the load), there generates a magnetic force that tends to bring the shaft 12 back into the equilibrium configuration, which corresponds to the shaft 12 aligned with the hub 20 (condition of minimum magnetic gap between the rectangular cross-section 58, the U cross-section and the magnets 60).

Figure 8:
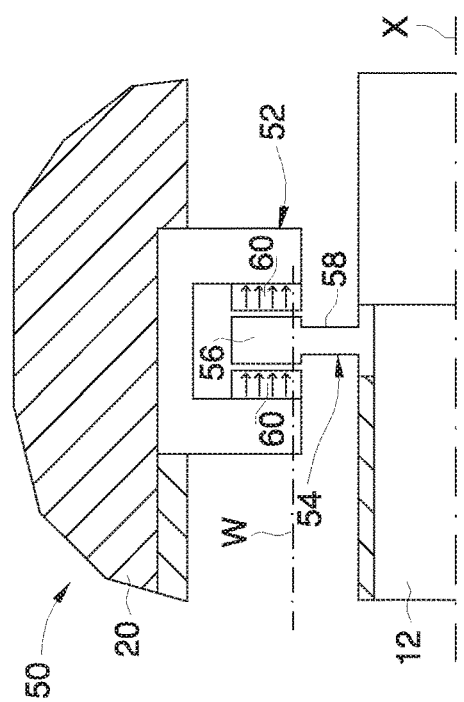

A simplification of the configuration in FIGS. 6-7 is shown in FIG. 8. The rectangular cross-section 56 is now without of the thickness restriction 58 and the corresponding element 54 is essentially constituted by a ring of ferromagnetic material, which in cross-section looks like a rectangle. This solution is very advantageous from a constructive simplicity point of view.

If the shaft 12 is misaligned from the hub 20, the elements 52, 54 are also misaligned A peripheral arc of circumference in the ring 54 with rectangular cross-section 56 comes out of the annular space between the magnets 60 crossed by the magnetic flux, and therefore a reaction force is created which tends to return the ring 54 to such annular space (i.e. it tends in FIG. 8 to move the hub 20 and shaft 12 closer).

Given the axial-symmetric geometry, a condition of balance of the X axis can be obtained without using the narrowing 58.

In a variant, the position of the parts 52, 54 can be swapped.

In all variants, to facilitate the assembly of the structure having U-shaped cross-section, it is preferable to realize it by the union of two elements, one having L-shaped cross-section and the other rectangular cross-section. Coupled and locked axially, these elements form the U cross-section.

Figure 9:
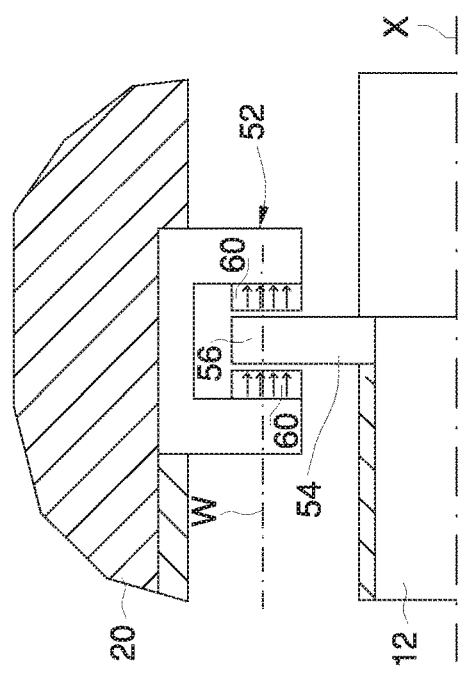
FIG. 9 shows a cross-section of a variant of the previous bearings.

The variants described are suitable for modular embodiments, of which it is shown an example in FIG. 9.

A series of U-shaped cross sections 90, made of ferromagnetic material, are coupled to each other to have a leg 92 in common, that is arranged in consecutive manner with comb shape. By inserting into each U a rectangular cross-section 56, multiple coupling surfaces and relative ait-gaps are obtained. The magnets 60 are mounted only on one leg of the U.

The magnetic flux passes through all the air gaps of the U-shaped cross-sections 90 (where the rectangular sections 56 are) and then closes inside the ferromagnetic material forming a ring in each U-shaped cross-section.

The greater constructive complexity allows obtaining greater load capacity and stiffness.

In this case, too, the U-shaped cross-sections 90 may be formed by composing more elements coupled together. This configuration also allows supporting loads that tend to misalign the shaft with respect to the hub. FIG. 9 shows an example with only two rectangular cross-sections used, but one can compose configurations with more rectangular cross-sections.

Here, too, the position of the sections 90 can be swapped with the cross-section 56.

Note that the structure of FIGS. 1÷2 and FIGS. 6÷9 exploits the same principle of FIGS. 3÷4. The magnetic interaction between the segments 14a, 14b and the cross-section of the ring 16 is the same as that occurring between the surfaces S1, S2. In both cases there is a ferromagnetic element which, at a resting point, determines upon itself or towards the other element a thickening of the magnetic flux lines, while if it moves orthogonally to the flux it induces a magnetic return force towards the resting point.

In the examples of FIGS. 1 to 9, the flux generator 60 is placed on one wall of an air-gap. In some applications, where a lot of precision or stability is required for the size of the air gap, or where the ease of assembly must be greater, it is better to use different solutions. To solve these problems, variants shown in FIGS. 10÷14 are proposed, which can be implemented also in one or each of the examples shown in FIGS. 1÷9.

Figure 10:
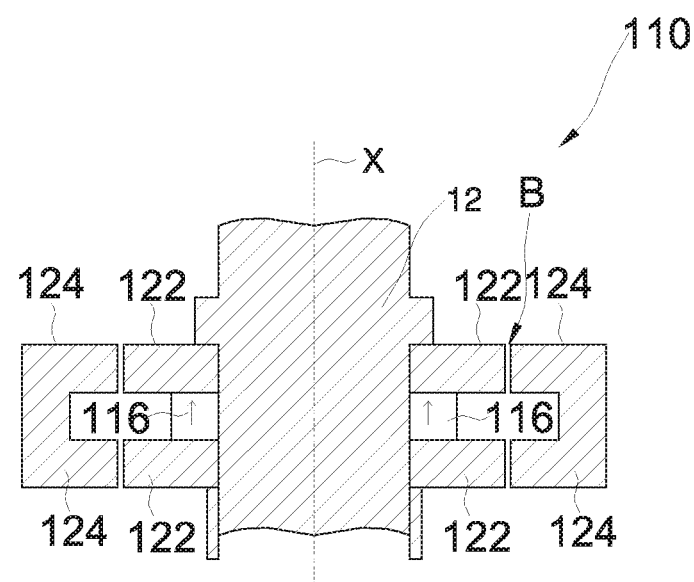
FIGS. 10-14 show variants for the configuration of a flus generator.

FIG. 10 shows schematically a bearing 110 for axial loading, which comprises the shaft 12 rotatable about the X axis. Two elements 122 and an element 124, all made of ferromagnetic material, form a circuit for the magnetic flux. The element 124 is annular, has a C-shaped cross-section, is external, fixed and integral with a hub (not shown); The elements 122 are internal rings, rotating and coupled with the shaft 112. The elements 122, 124 have annular shape and cross-sections that together form a torus interrupted by an annular gap or meatus. The magnetic flux generator is constituted of a permanent magnet 116 with a polar axis parallel to the X axis and placed between the two elements 122. The magnetic flux passes through the elements 122, the gap B in air, and closes inside element 124.

Figure 11:
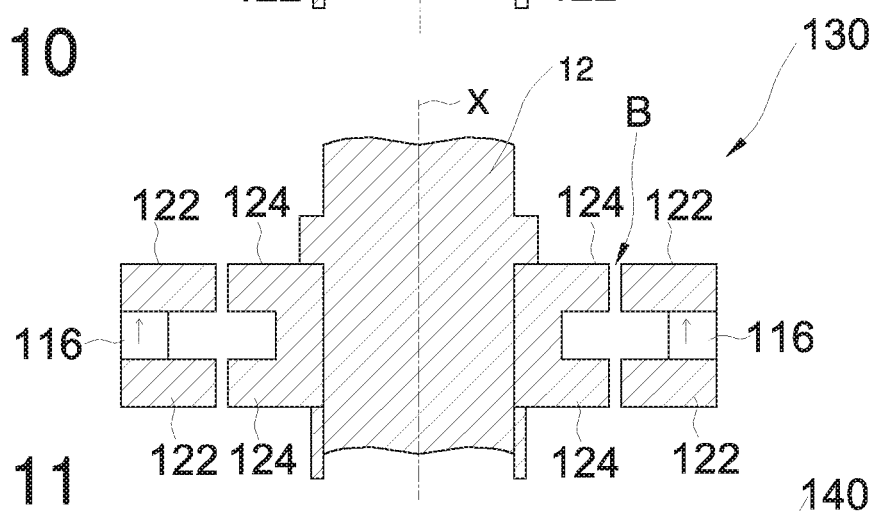

FIG. 11 shows a variant 130 of FIG. 10. Here the elements 122 and 124 have been exchanged places, and the magnet 116 is now part of the external fixed element.

Figure 12:
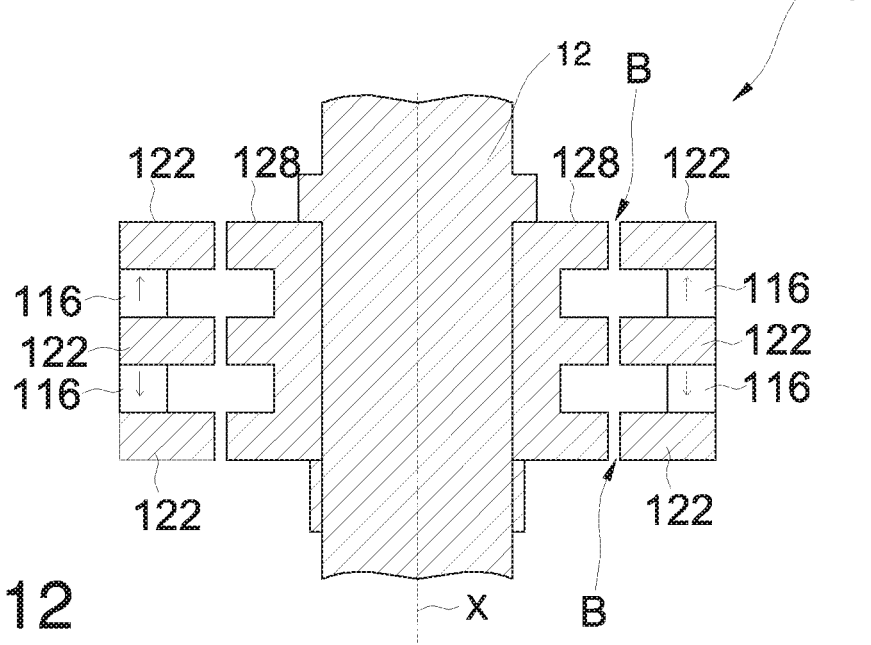

FIG. 12 shows a variant 140 of FIG. 11 to show an example of how to increase the loading capacity by increasing the number of air-gaps B which generate a magnetic reaction force. The magnets 116 are sandwiched between elements 122, each of which conducts flux and directs it towards a polar expansion of an element 128 with an E-shaped cross-section, on the other side of the air gap B.

The number of elements 112, corresponding to the number of polar expansions of the element 128 and to the number of air gaps B, can however vary from what is shown. In the case of FIG. 12, too, the position of the elements 122 can be swapped with the element 128.

Figure 13:
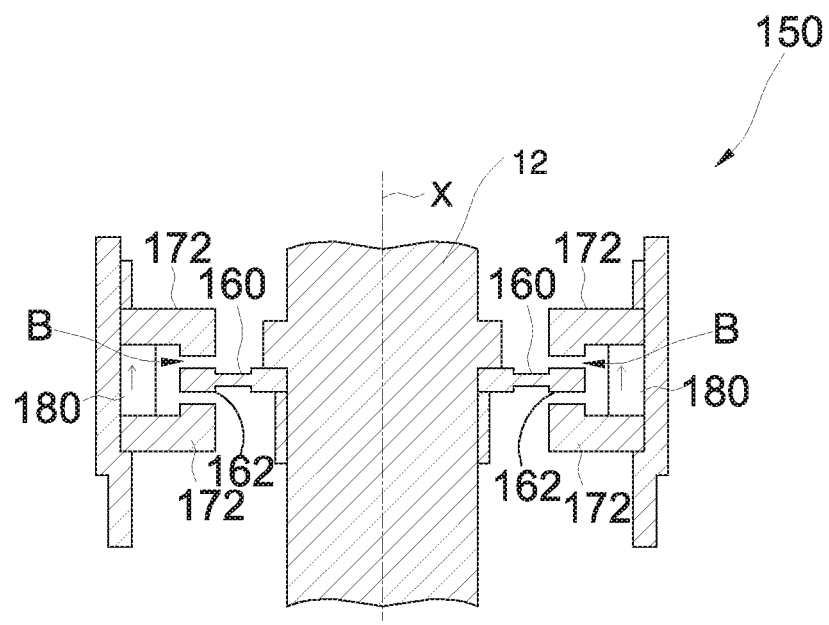

In FIG. 13 a bearing 150 for radial load is schematically shown. To the shaft 12 a disk 160 is fixed which at the free peripheral end has a circular crown 162 of increased cross-section. The crown 162 is rotatable inside an air gap B delimited by a sandwich formed by two rings 172 and an annular permanent magnet 180 placed between the two rings 172. The magnet 180 and the two rings 172 form a toroidal structure with C-shaped cross-section. The rings 172 and the crown 162 are made of ferromagnetic material and together with the air gap B form a toroidal closed circuit for the flux generated by the magnet 180.

Figure 14:
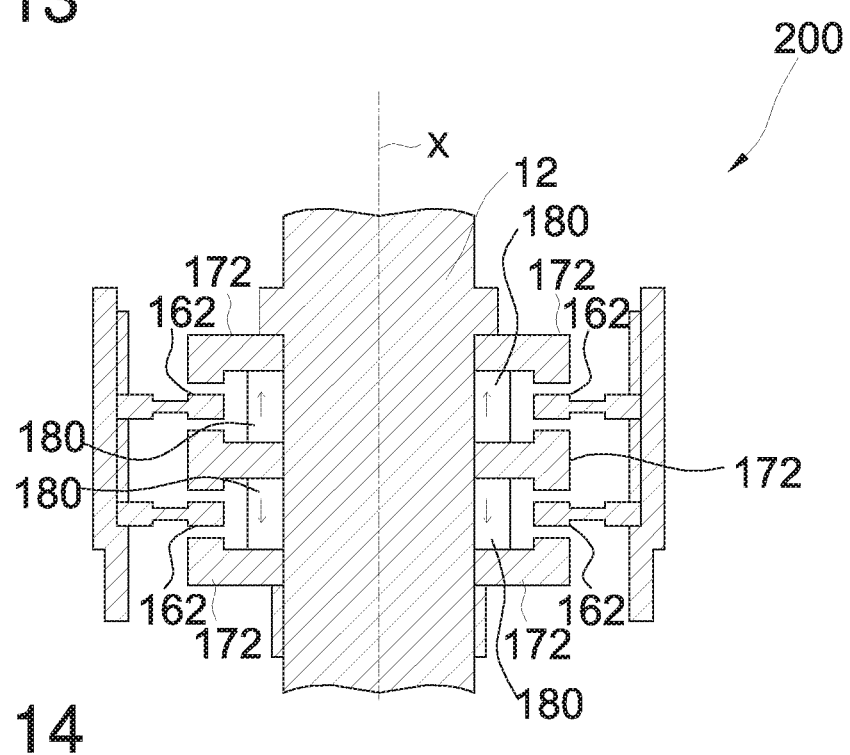

The position of the disk 160 and of the rings 172 can be swapped, as can be seen in the variant 200 of FIG. 14. Optionally, as shown in FIG. 12, the number of air-gaps B may also be increased by increasing the number of disks 160. In the example of FIG. 14 there are two disks 160 with relative crowns 162. Each crown 162 is inserted into an air gap B created by two rings 172.

In the structures of FIGS. 10÷14 the permanent magnet may be implemented or powered by the series of various piled-up permanent magnets. Or in the structures of FIGS. 10÷14 the number of permanent magnets may vary from what is illustrated. E.g. in FIG. 14 or 12 only one permanent magnet 116, 180 may be inserted in the magnetic circuit, and not two. The magnetic flux generated by the only magnet will travel the elements made of ferromagnetic material to close on itself, therefore any air gap B will be traversed by magnetic flux.

Further variants are possible.

In FIGS. 10, 11, 12, for simplicity of construction, the element 124 and/or 128 may consist of several parts in ferromagnetic material fixed together to compose the illustrated solid. For example two disks and a central ring between two disks to form an annular body with a C cross-section.

As mentioned, in FIGS. 12 and 14 the number of pole expansions can be equal to two, three or more. The arrangement of flux generators, in the case of two or more annular generators as in the figures, is such that the polarity of the magnetic field generated by them has alternating orientation in the axial direction. That is, if, taken a reference direction parallel to the X axis, a ring generates an N-S field, the next ring generates an S-N field, and so on.

Note in general that the position of the flux generator inside the magnetic circuit formed by the ferromagnetic elements may vary. In particular, for greater ease of assembly and greater accuracy of the air gap. the flux generator may be arranged so that the polar axis of the field generated by the flux generator can have direction parallel to the rotation axis. In particular, the flux generator may be arranged between two ferromagnetic elements for channeling the flux orthogonally to the rotation axis so as to make it travel a closed circuit.

The invention claimed is:

1. Magnetic suspension bearing comprising:
    a part rotatable about a rotation axis and a fixed part,
    two elements, a first element and a second element, made out of ferromagnetic material, one integral with the rotatable part and one with the fixed part which are separated by an air gap, and
    have axial symmetry with respect to said axis;
    a magnetic flux generator for generating a magnetic flux inside the two elements;

wherein the two elements have such a shape that the magnetic flux, flowing inside the two elements, describes in space a torus and passes from one element to the other through the air gap along a direction orthogonal to the direction of a load applied to the bearing, and (a) the first element is annular, has a U-shaped cross-section, and the flux generator is placed on one wall of the air-gap, the wall belonging to the first element, or (b) the first element is annular, has a U-shaped cross-section, and is formed by two elements between which in direct contact with the flux generator, which is constituted of a permanent magnet with a polar axis parallel to the rotation axis, is placed, so that the magnetic flux passes through said two elements of the first element and the gap in air, and closes inside the second element.

2. Bearing according to claim 1, wherein the generator is configured to generate a circular tube of magnetic flux which, viewed in cross-section with respect to a plane passing through the axis of rotation, flows inside the two elements and passes from one element to the other by crossing the air gap along a direction orthogonal to the axis of rotation.

3. Bearing according to claim 1, wherein the generator is configured to generate a circular tube of magnetic flux which, viewed in cross-section with respect to a plane passing through the axis of rotation, flows inside the two elements and passes from one element to the other by crossing the air gap along a direction parallel to the axis of rotation.

4. Bearing according to claim 1, wherein
the first element comprises a cavity or recess crossed by the flux, and the second element is inserted into the cavity or recess being able to move linearly along the direction of the load; the two elements defining for the magnetic flux an air gap inside the cavity or recess.

5. Bearing according to claim 4, wherein the cavity or recess is a radial space, present between the first and second element, with shape of a ring coaxial to the rotation axis.

6. Bearing according to claim 5, wherein the radial space is delimited by two facing surfaces, each surface being comprised respectively in one of said elements, and wherein said two facing surfaces lie on lateral surfaces of imaginary cylinders having as axis said rotation axis; respectively increasing radius, and no intersection with the respective element.

7. Bearing according to claim 6, wherein the magnetic flux generator is arranged on said facing surfaces of said elements.

8. Bearing according to claim 4, wherein the flux passing through the cavity or recess has direction substantially orthogonal to the axis of rotation and hits transversely the second element.

9. Bearing according to claim 4, wherein the flux passing through the cavity or recess has a direction substantially parallel to the axis of rotation and hits transversely the second element.

10. Bearing according to claim 4, wherein the two elements are configured to form two or more air gaps.

11. Bearing according to claim 1, wherein the first and second elements are inserted one into the other, being able to slide relatively along the insertion direction.

12. Bearing according to claim 1, wherein one or each said element is formed by two or more parts in ferromagnetic material between which the magnetic flux generator or a second magnetic flux generator is interposed.

13. Bearing according to claim 1, wherein the first element has a U cross-section and the second element has a rectangular cross-section,
the first element and the second element being coupled in such a way that the greater cross-section is inside the U cross-section,
the flux generator consisting of a pair of rectangular cross-sectioned annular magnets placed on the two parallel surfaces inside the mouth of the U cross-section.

14. Bearing according to claim 13, wherein the second element comprises a narrowing of the thickness, so as to have a mushroom-shaped cross-section.

15. Bearing according to claim 14, wherein said U-shaped cross-section is made by the union of two elements, one having L-shaped cross-section and the other rectangular cross-section.

16. Bearing according to claim 13, wherein said U-shaped cross-section is made by the union of two elements, one having L-shaped cross-section and the other rectangular cross-section.

\* \* \* \* \*